3,306,759
ALKYL-HYDROGEN-POLYSILOXANE
EMULSIONS
Hans-Horst Steinbach, Leverkusen, Germany, assignor to Farbenfabriken Bayer Aktiengesellschaft, Leverkusen, Germany, a corporation of Germany
No Drawing. Filed Dec. 12, 1962, Ser. No. 244,002
Claims priority, application Germany, Dec. 23, 1961, F 35,646
6 Claims. (Cl. 106—287)

The invention concerns an improvement in aqueous polysiloxanes containing Si—H bonds, with the aim of repressing the well-known hydrolytic splitting off of hydrogen and of increasing the stability of the emulsions.

Aqueous emulsions of organopolysiloxanes which also contain alkyl-hydrogen-polysiloxanes have for some time been employed for manifold applications, particularly for the impregnation of fibre materials of all types, where they are also often combined with crease-proofing agents. It is customary to impregnate textiles therewith and subsequently to heat them in order to provide them with a water-repellent surface, the reactivity of the H—Si group promoting the permanence of the impregnation.

This reactivity causes difficulties in the storage of such emulsions and in their transport over long distances, owing to the evolution of hydrogen and to the breakdown associated therewith. It has already been proposed to alleviate these disadvantages by adding a protective colloid such as polyvinyl alcohol and by increasing the viscosity of the emulsions. Besides, it is known to prepare self-emulsifying solutions of polysiloxanes in order to overcome the problem. However, such measures often prove unsatisfactory since they limit their range of application, for instance by impairing their capacity for being combined with crease-proofing agents, and since the "liquors," i.e. the emulsions prepared by strong dilution with water at the place of application, become unstable.

It has been found that it is possible to obtain aqueous emulsions containing alkyl-hydrogen polysiloxanes of excellent stability, and in particular with extremely slight evolution of hydrogen gas, when in addition to an organic nitrogen compound known to be an emulsifying agent a primary aminocarboxylic acid is added to the emulsion mixture in a proportion by weight of between 0.1 and 5 percent, referred to the amount of the oil phase. In order that optimum results may be achieved, it is recommended that some additional conditions be observed:

The silicone oils to be emulsified, usually mixtures of diorganosiloxane polymers and alkyl-hydrogen-polysiloxanes, to which organic solvents may also have been added, should have viscosities of between 500 and 1000 cst. A halogenoalkane, for instance tetrabromoethane, is to be added to these siloxane oils in such amounts that the density of the oil mixture amounts to little more than 1 g./cc. The amount of the oil mixture thus obtained should amount to about 40 percent by weight of the commercial emulsion, stable to storage.

Among the known emulsifiers, quaternary alkylammonium compounds, particularly cetyl-benzyl-dimethylammonium chloride, are especially suitable. In general, use is made of between 0.5 and 3, preferably between 0.8 and 1.6 percent by weight, referred to the emulsion. Amines with long alkyl chains are also suitable, but not primary and secondary amines with short alkyl chains.

It is important to maintain a pH value in the range between 2.5 and 5, preferably between 3 and 4, and to ensure the lowest possible content of inorganic salts. The pH value is best adjusted with hydrochloric acid. Monochloracetic acid, malonic acid, maleic acid, and hydriodic acid are also suitable to some extent.

The essential characteristic of the aminocarboxylic acids to be added according to the invention is their NH$_2$ group. Otherwise, they may be monobasic carboxylic acids with a short C-chain, such as glycine, or also a longer one, such as 6-aminocapronic acid, or again polybasic carboxylic acids such as glutamic acid. A compound substituted several times on the nitrogen, such as methyl-glycine, has proved to be entirely unsuitable, and also an aminosulphonic acid such as taurine.

The mechanism of the aminocarboxylic acids has not yet been explained, and it is obviously not based on buffering of the pH value, as might have been supposed owing to its known significance for the decomposition tendency of the H—Si compounds. Apart from the low buffer activity of a 0.02 N aminocarboxylic acid in the pH range of interest here, it has been possible to show that the buffers from hydrochloric acid and sodium citrate or potassium biphthalate which are more favourable within this range produce emulsions which are unsuitable owing to their instability and gas evolution. By contrast, the elimination of hydrogen at room temperature is so low in the emulsions prepared according to the invention that during the tests described in the following examples, heating was required, with vigorous stirring, in order to obtain conveniently measurable amounts of gas. This is even more surprising since although the known emulsions prepared with quaternary alkylammonium salts as emulsifying agent provide very good hydrophobization effects on textiles, they can nevertheless not be stored as their stability per se is insufficient and as in addition the traces of amines almost always contain in commerical alkylammonium salts strongly accelerate H—Si decomposition.

The following examples are given for the purpose of illustrating the invention.

*Example 1*

An oil mixture is prepared from 43 g. of α,ω-dihydroxypolydimethylsiloxane of viscosity 1000 cst., 147.8 g. of α,ω-dihydroxypolydimethylsiloxane of viscosity 18,000 cst., 191 g. of methyl-hydrogen-polysiloxane of the formula

wherein $x$ has a mean value of 36 (viscosity about 20 cst.), and 18.2 g. of 1,1,2,2-tetrabromoethane.

The viscosity of this oil mixture amounts to 814 cst. and its density to 1.02 g./cc.

The mixture is added to a solution of 1.5 g. of glycine and
8.5 g. of cetyl-benzyl-dimethyl-ammonium chloride in 590 g. of water, and the whole mixture is emulsified in one of the devices customary for the purpose. An extremely stable emulsion is obtained at a pH value of 3.5, if necessary after correcting the acidity with hydrochloric acid or sodium hydroxide solution, from which stable liquors can also be produced in combination with crease-proofing agents. The emulsion can also be combined with zirconium salts or employed as a curing agent in a mixture with other organopolysiloxane emulsions.

1000 g. of the emulsion prepared by the described method only evolved 10 cc. of hydrogen gas during intensive stirring at 40° C. lasting for 2 days. No gas could yet be observed after 3 days when the emulsion had been standing at 25° C.

*Examples 2 and 3*

Instead of the glycine employed in Example 1, there are used the equimolar amounts of 6-aminocapronic acid (2.6 g.) or of glutamic acid (2.9 g.), and otherwise the procedure is the same as described above. The resulting emulsions at a pH value of 3.4 do not differ from the emulsion prepared according to Example 1 in respect of their stability, gassing, and liquor stability.

A series of comparative experiments (A) with other types of aminoacids, (B) with buffer materials, and (C) without such additives gave the following results:

(A) When instead of the glycine employed in Example 1, use was made of an equimolar amount of methylglycine (1.8 g.) and otherwise the procedure was the same as described above, the emulsion produced at a pH value of 3.5 was so unstable that on standing at rest at 25° C. it had already broken down into separate phases within 24 hours and had deposited the clear oil, so that a measurement of gas evolution suitable as a comparative estimation could not be carried out.

When instead of the aminocarboxylic acid, 2.5 g. of taurine were employed whilst the other conditions were kept constant, a very unstable emulsion was formed which evolved 32 cc. of hydrogen during 2 days when stirred at 40° C.

(B) An emulsion which was also very unstable and from which 224 cc. of hydrogen were given off during 2 days when stirred at 40° C. was obtained by replacing the glycine in Example 1 by the equivalent amount of citric acid and by adjusting the pH value to 3.5 with normal sodium hydroxide solution.

A relatively stable emulsion, from which however 52 cc. of hydrogen were given off during the test, was obtained by the replacement of glycine with 3.9 g. of potassium biphthalate.

(C) An emulsion at a pH value of 3.4 prepared by analogy with Example 1 but without the addition of glycine or another aminoacid gave off 43 cc. of hydrogen gas during 2 days when stirred at 40° C. The gas evolution increased and the stability decreased with time. The emulsion had broken down into separate phases after 2 weeks when allowed to stand at rest at room temperature and had deposited the clear oil.

An emulsion from 500 g. of methyl-hydrogen-polysiloxane,
69 g. of cetyl-benzyl-dimethyl-ammonium chloride,
2 g. of glacial acetic acid, and
500 g. of water prepared in adaptation from Example 1 of British patent specification 645,768 had a pH value of 3.5 but was so unstable that it had broken down into separate phases after 24 hours and thus did not permit a comparative measurement of the amount of hydrogen given off.

I claim:
1. A process for the production of stable aqueous emulsions containing alkyl-hydrogen-polysiloxanes which comprises incorporating 0.04 to 2 percent by weight of a primary aminocarboxylic acid selected from the group consisting of glycine, 6-amino-capronic acid and glutamic acid into a mixture of (1) about 40 percent by weight of methylpolysiloxane having a viscosity of between 500 and 1,000 cst. at 20° C. selected from the group consisting of a methyl-hydrogen-polysiloxane and a mixture of methyl-hydrogen-polysiloxane and polydimethylsiloxanes, said methylpolysiloxane being modified by the addition of a halogen-alkane so that a density of slightly more than 1 g./cc. has been obtained, (2) 0.5 to 3 percent by weight of an emulsifying agent selected from the group consisting of a quaternary alkylammonium salt and a long-chain alkylamine, and (3) water as the remainder, and adjusting the pH of the resulting aqueous emulsion to a value of between 2.5 and 5.0 with hydrochloric acid.

2. Process according to claim 1 wherein said pH is adjusted to a value of between 3 and 4.

3. Aqueous emulsion of (1) about 40 percent by weight of methylpolysiloxane having a viscosity of between 500 and 1,000 cst. at 20° C., selected from the group consisting of a methyl-hydrogen-polysiloxane and a mixture of methyl-hydrogen-polysiloxane and polydimethylsiloxanes, said methyl-polysiloxane being modified by the addition of a halogeno-alkane so that a density of little more than 1 g./cc. has been obtained, (2) 0.5 to 3 percent by weight of an emulsifying agent selected from the group consisting of a quaternary alkylammonium salt and a long-chain alkylamine, (3) 0.04 to 2 percent by weight of a primary aminocarboxylic acid selected from the group consisting of glycine, 6-amino-capronic acid, and glutamic acid, and (4) water as the remainder, said aqueous emulsion being adjusted to a pH value of between 2.5 to 5 with hydrochloric acid.

4. An aqueous emulsion according to claim 3 wherein said aminocarboxylic acid is glycine and said quaternary alklyammonium salt is cetyl-benzyl-dimethyl ammonium chloride.

5. An aqueous emulsion according to claim 3 wherein said aminocarboxylic acid is 6-aminocapronic acid and said quaternary alkylammonium salt is cetyl-benzyl-dimethyl ammonium chloride.

6. An aqueous emulsion according to claim 3 wherein said aminocarboxylic acid is glutamic acid and said quaternary alkylammonium salt is cetyl-benzyl-dimethyl ammonium chloride.

References Cited by the Examiner
UNITED STATES PATENTS

| | | | |
|---|---|---|---|
| 2,833,022 | 5/1958 | Collings | 117—135.5 |
| 2,833,735 | 5/1958 | Nitzsche et al. | 117—135.5 |

MORRIS LIEBMAN, *Primary Examiner.*
ALLAN LIEBERMAN, *Examiner.*